(12) United States Patent
Vasquez (10) Patent No.: US 9,843,223 B1
(45) Date of Patent: Dec. 12, 2017

(54) SYSTEM AND METHOD FOR CONTROLLING PHANTOM POWER LOSSES IN A BUILDING

(71) Applicant: Ricardo Vasquez, Philadelphia, PA (US)

(72) Inventor: Ricardo Vasquez, Philadelphia, PA (US)

( * ) Notice: Subject to any disclaimer, the term of this patent is extended or adjusted under 35 U.S.C. 154(b) by 0 days.

(21) Appl. No.: 15/166,258

(22) Filed: May 27, 2016

(51) Int. Cl.
| G08B 21/00 | (2006.01) |
| H02J 13/00 | (2006.01) |
| H01H 9/54  | (2006.01) |
| H01H 71/02 | (2006.01) |
| H01H 71/04 | (2006.01) |
| H02B 1/48  | (2006.01) |
| H02J 3/04  | (2006.01) |
| H02M 7/44  | (2006.01) |
| G08B 5/36  | (2006.01) |
| G08B 21/18 | (2006.01) |
| G06Q 20/34 | (2012.01) |

(52) U.S. Cl.
CPC .......... *H02J 13/0075* (2013.01); *G06Q 20/34* (2013.01); *G08B 5/36* (2013.01); *G08B 21/18* (2013.01); *H01H 9/54* (2013.01); *H01H 71/02* (2013.01); *H01H 71/04* (2013.01); *H02B 1/48* (2013.01); *H02J 3/04* (2013.01); *H02M 7/44* (2013.01)

(58) Field of Classification Search
CPC .. H02J 13/0075; H02J 13/001; H02J 13/0079; G06Q 20/34; H04B 10/1143; H04B 10/40

USPC ......................................................... 340/644
See application file for complete search history.

(56) References Cited

U.S. PATENT DOCUMENTS

| 5,003,486 | A  |    | 3/1991  | Hendel et al. |
| 5,455,464 | A  |    | 10/1995 | Gosling |
| 6,018,690 | A  |    | 1/2000  | Saito et al. |
| 7,257,466 | B2 |    | 8/2007  | Kreiner |
| 7,982,335 | B2 |    | 7/2011  | Aldag et al. |
| 7,983,795 | B2 |    | 7/2011  | Josephson et al. |
| 7,995,314 | B2 | *  | 8/2011  | Titus ........................ H02H 3/04 |
|           |    |    |         | 361/42 |
| 8,033,686 | B2 | *  | 10/2011 | Recker ............... H05B 33/0803 |
|           |    |    |         | 362/249.02 |
| 8,244,405 | B2 |    | 8/2012  | Kao et al. |
| 8,442,792 | B1 |    | 5/2013  | Elberbaum |
| 8,519,566 | B2 | *  | 8/2013  | Recker .................... H02J 9/065 |
|           |    |    |         | 307/64 |
| 8,723,653 | B2 |    | 5/2014  | Jansma |

(Continued)

*Primary Examiner* — John A Tweel, Jr.
(74) *Attorney, Agent, or Firm* — LaMorte & Associates, P.C.

(57) ABSTRACT

A system for controlling the area circuits that stem from a circuit breaker box in a building. A switch activation unit is provided and is wired to the outgoing wires of a circuit breaker box. The switch activation unit contains a switch for each of the area circuits to be controlled. The switches are wired in series between the circuit breakers in the circuit breaker box and the area circuits. A control unit communicates with the switch activation unit and selectively controls the on/off state of its switches. The control unit is programmable and can activate and deactivate different area circuits at different preprogrammed times. The control unit can also be operated remotely using a link to a smart device.

14 Claims, 6 Drawing Sheets (56) References Cited

U.S. PATENT DOCUMENTS

| | | | |
|---|---|---|---|
| 8,773,827 B2 * | 7/2014 | Kiko | H02J 3/14 361/2 |
| 8,818,532 B1 | 8/2014 | Vasquez | |
| 9,553,451 B2 * | 1/2017 | Zacharchuk | H04L 12/2816 |
| 2003/0227220 A1 | 12/2003 | Biskup et al. | |
| 2009/0273334 A1 | 11/2009 | Holovacs et al. | |
| 2010/0019575 A1 | 1/2010 | Verges | |
| 2012/0089263 A1 | 4/2012 | Park et al. | |
| 2012/0089267 A1 * | 4/2012 | Jewell | H02J 13/001 700/295 |
| 2015/0012145 A1 * | 1/2015 | Kiko | H02J 3/14 700/291 |
| 2016/0285550 A1 * | 9/2016 | Economy | H05B 37/0272 |
| 2016/0358722 A1 * | 12/2016 | Lakshmanan | G05B 15/02 |

\* cited by examiner

SYSTEM AND METHOD FOR CONTROLLING PHANTOM POWER LOSSES IN A BUILDING

BACKGROUND OF THE INVENTION

1. Field of the Invention

In general, the present invention relates to systems and methods that control the supply of power to individual wired area circuits in a home or business. More particularly, the present invention relates to control systems that enable a user to selectively activate and deactivate wired area circuits and/or individual fixtures within a particular area circuit of a home or business.

2. Prior Art Description

In the United States, electrical power is typically provided to commercial and residential buildings as alternating current at 120 volts and 60 Hz. Within a home or building, power is divided into smaller area circuits. Power to each area circuit is controlled by a separate circuit breaker. The circuit breakers are wired within a circuit breaker box. The number of outlets and fixtures assigned to each area circuit are governed by various federal, state, and local building codes. However, in most wiring scenarios, an area circuit typically contains less than ten outlets and fixtures in combined total.

In a modern household or office, many products consume electricity even when they are not being used. For example, many printers and copy machines maintain hot internal elements at all times, whether or not the machine is in use. Battery chargers for phones and laptops continue to draw electricity even after the battery they are charging is fully charged. There are hundreds of products that use AC-to-DC transformers. Such transformers draw electricity even when the item they power is not in use. The electricity that is being consumed is wasted electricity and this lost power is commonly referred to as "phantom power loss". In a typical home or building, phantom power losses can account for between 10% and 20% of the power used.

Significant power conservation and cost savings can be achieved if phantom power losses can be reduced. The easiest way to reduce phantom power losses is to unplug an electronic item when it is not being used. However, unplugging the dozens of such items in an average home or office is not practical. An alternative solution is to cut the power to the receptacles in which these devices are plugged. This can be done by switching the power off at the circuit breaker box. This is also impractical because circuit breaker boxes are typically hard to access. Furthermore, power to items such as lights and refrigerators must be maintained.

In the prior art, attempts have been made to reduce the degree of phantom power losses. In U.S. Pat. No. 8,818,532 to Vasquez, the Applicant herein, a system is disclosed where power used by individual power receptacles can be controlled. Such a system is useful, however, it requires a person to physically interact with a receptacle in order to activate or deactivate that receptacle.

The Applicant has improved upon his prior system. In the present invention, the Applicant sets forth a system where a user can activate or deactivate not only individual receptacles but entire area circuits. Furthermore, the control of the receptacles and area circuits can be programmed and executed from a remote location. The details of the present invention are described and claimed below.

SUMMARY OF THE INVENTION

The present invention is a system for controlling the area circuits that stem from a circuit breaker box in a building. A switch activation unit is provided and is wired to the outgoing wires of a circuit breaker box. The switch activation unit contains a switch for each of the area circuits to be controlled. The switches are wired in series between the circuit breakers in the circuit breaker box and the area circuits. As such, any electricity flowing into the area circuits from the circuit breakers must pass through a switch of the switch activation unit.

A separate and distinct control unit is provided that is remote from the switch activation unit. The control unit has bidirectional communications with the switch activation units and selectively controls the on/off state of the switches in the switch activation units. The control unit is programmable. As such, the control unit can activate and deactivate different area circuits at different preprogrammed times. The control unit can also be operated remotely using a link to a smart phone, or other smart computing device, that runs a control software application for the smart device.

The control unit can have its own encrypted network and read only memory (ROM) that work in conjunction with other established secure networks. This enables the system to send encrypted data concerning the user's ID, date, power usage, time and the like throughout the system.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention system can be embodied in many applications, such as in the wiring of a commercial building, the embodiments illustrated show the system being used in the wiring of a typical residential home. These embodiments are selected in order to set forth some of the best modes contemplated for the invention. The illustrated embodiments, however, are merely exemplary and should not be considered limitations when interpreting the scope of the appended claims.

Figure 1:
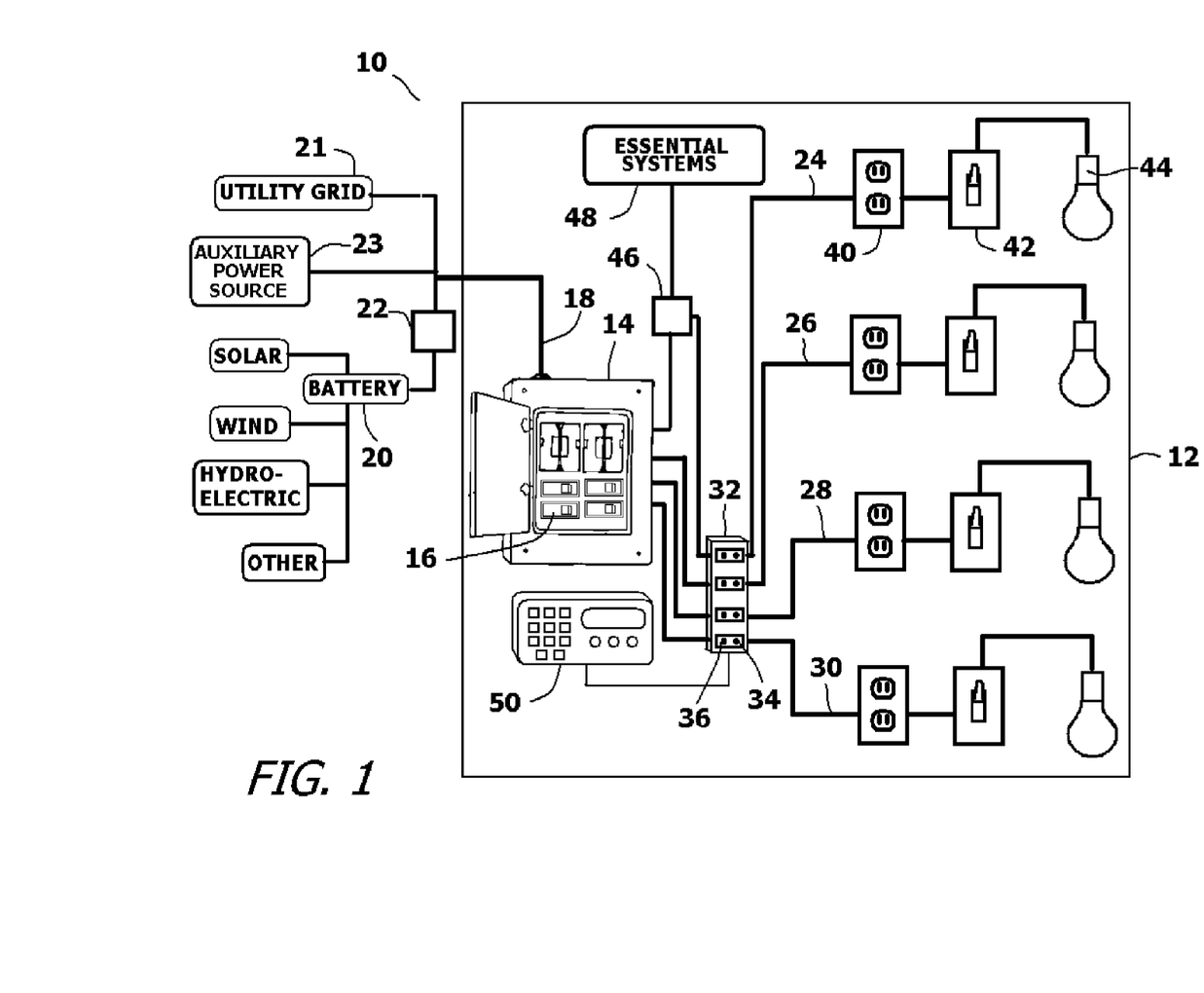
FIG. 1 is a general schematic of an exemplary embodiment of the overall system.

Referring to FIG. 1, a schematic shows the present invention system 10 incorporated into the wiring of a typical residential house 12. As can be seen, the house 12 contains a circuit breaker box 14. The circuit breaker box 14 holds a plurality of circuit breakers 16. The circuit breaker box 14 receives power through incoming electrical power cables 18 that run to the house 12. Electricity is provided to the house 12 in this manner. The incoming electricity is typically from the power grid 21 of the local utility. Alternatively, power can be provided from an auxiliary power source 23, such as a private generator or from a battery bank 20. Houses that use battery banks 20 typically recharge the batteries using solar power or wind power. The battery bank 20 can also use replaceable batteries that are recharged offsite. Such battery systems are disclosed in U.S. Pat. No. 8,816,534 to Vasquez, the disclosure of which is incorporated herein by reference. In the Vasquez patent, the offsite batteries are stored and charged by a hybrid vehicle. Batteries store direct current. If batteries from a vehicle are used as a power source, it should be understood that the offsite batteries can be used without removing the batteries from the vehicle. Power drawn from the storage batteries of a vehicle can be purchased and controlled using a credit card and a software application. For DC elements, the power from the auxiliary power sources 23 can be used directly. For the AC airing of a traditional home, the DC electricity is converted to 120 volt @ 60 Hz by a DC-to-AC converter 22.

Regardless of the source of the incoming electrical power, the electricity passes into the circuit breaker box 14. Within the circuit breaker box 14, the incoming electricity is wired to the circuit breakers 16. Each circuit breaker 16 controls the flow of electricity to different area circuits 24, 26, 28, 30 that are wired within the house 12.

In accordance with the present invention, not all the outgoing wires that travel from the circuit breakers 16 to the area circuits 24, 26, 28, 30 travel uninterrupted. Rather, at least some of the wires that come out of the circuit breaker box 14 pass into a switch activation unit 32. As will later be explained in more detail, automated switches 34 are provided within the switch activation unit 32. At least one switch 34 can be provided for each of the area circuits 24, 26, 28, 30 in the house 12 or other building. The switches 34 are in series with the circuit breakers 16 and the area circuits 24, 26, 28, 30. As such, if a switch 34 is open, the switch 34 will disrupt the flow of electricity from the circuit breakers 16 to the area circuits 24, 26, 28 30. Likewise, if a switch 34 is closed, the switch 34 will pass electricity from the circuit breaker 16 to the area circuits 24, 26, 28, 30 without disruption.

The switch activation unit 32 has manual overrides 36 that enable a user to turn a particular switch 34 "on" or "off" manually. The manual overrides 36 also serve as visual indicator that informs a user of the status of a particular switch 34 in the switch activation unit 32.

In the shown embodiment, four area circuits 24, 26, 28, 30 are shown by way of example. The switches 34 in the switch activation unit 32 correspond in number to the area circuits 24, 26, 28, 30 to be controlled. As such, the switch activation unit 32 of the example will contain four independent switches 34. In this manner, the switch activation unit 32 can selectively control the flow of electricity to any or all of the area circuits 24, 26, 28, 30. The switches 34 in the switch activation unit 32 are controlled electronically.

Each area circuit 24, 26, 28, 30 illustrated shows a receptacle 40, a wall switch 42 and a light fixture 44. It will be understood that area circuits 24, 26, 28, 30 can contain many receptacles, many switches and many light fixtures. The illustration is merely a simplified representation. All the area circuits 24, 26, 28, 30 are wired directly to different switches 34 in the switch activation unit 32. The second, third and fourth area circuits 26, 28, 30 are also wired, in series, to the circuit breakers 16 in the circuit breaker box 14. However, in the first area circuit 24, a junction box 46 is disposed between the circuit breaker box 14 and the switch activation unit 32. The junction box 46 enables the first area circuit 24 to be divided so that some wiring passes through the switch activation unit 32 and some does not. The wires that do not pass through the switch activation unit can be directed to essential systems 48, such as refrigerators and environmental lighting, that should not be deactivated by the present invention system 10.

The switches 34 in the switch activation unit 32 are controlled by a control unit 50. In the exemplary embodiment of FIG. 1, the control unit 50 is shown as a separate device that is wired to the switch activation unit 32. This embodiment is one of many. It should be understood that the switch activation unit 32 and the control unit 50 can be integrated into a single unit. However, by having the control unit 50 and the switch activation unit 32 as separate devices, the control unit 50 can be mounted in a convenient location that is remote from the circuit breaker box 14.

Bidirectional communications between the control unit 50 and the switch activation unit 32 can be accomplished using a dedicated communications cable or wireless transmission. It should also be understood that control signals can also be promulgated through the wires leading to and from the area circuits 24, 26, 28, 30. The control signals are sent at voltage and waveform that does not interfere with the flowing AC power and vice versa.

Figure 2:
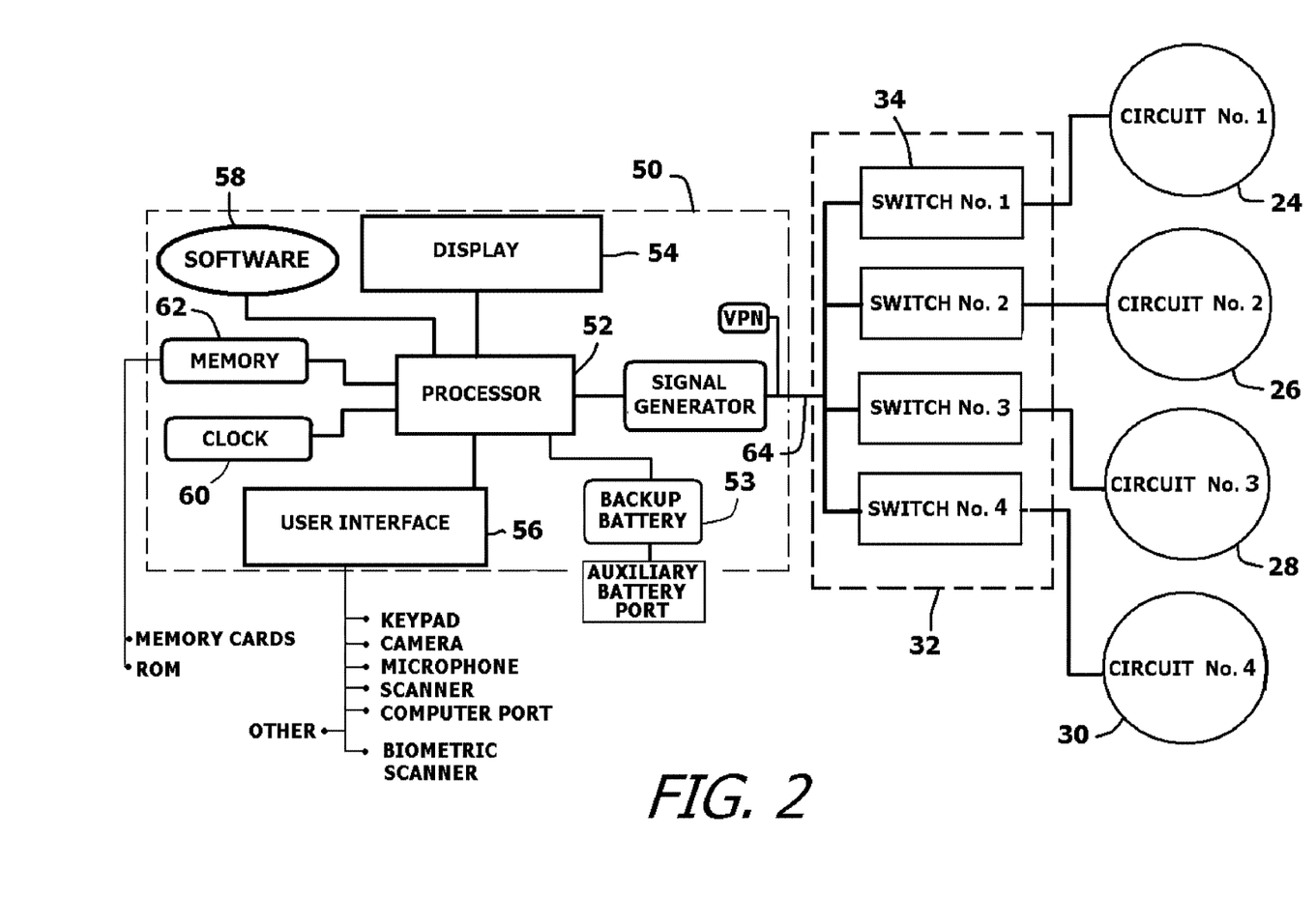
FIG. 2 is a more detailed schematic showing the electronic components utilized in the elements of the present invention system.

Referring to FIG. 2 in conjunction with FIG. 1, it can be seen that the control unit 50 contains its own processor 52. The processor 52 is coupled to a display 54 and to a user interface 56. The user interface 56 contains a key board or a touch screen. However, other input devices, such as cameras, a microphone, an optical scanner, and a computer drive port can also be provided to receive data in various formats from various sources. The user interface 56 can also contain a USB port or similar connection that enables auxiliary devices to be interconnected with the system. The display 54 and user interface 56 enable a user to interact with program control software 58 being run by the processor 52. The software 58 provides two program functions to the control unit 50. The first program function is the on/off control of each switch 34 in the switch activation unit 32. Using this program function, a user can immediately send a signal to any or all of the switches 34 to immediately turn either "on" or "off". In this first program function, the switches 34 can be used to isolate any or all of the area circuits 24, 26, 28, 30 from the circuit breakers 16.

The processor 52 has a clock 60 and a memory 62. The memory 62 can be supplemented by removable memory cards that enable the memory to be updated from time to time. The memory 62 and/or any memory card that is used may have directional encrypted storage capabilities. Access to the memory 62 and/or any memory card can be secured using biometric verification. Biometric verification can be obtained using biometric data acquisition devices. Biometric data acquisition devices can be plugged into the user interface 56 of the control unit 50. The biometric data acquisition devices can function bi-directionally and can communicate data throughout the system using a unique carrier signal and a particular address within the system.

In a second program function, the clock 60 and memory 62 are utilized by the processor 52. Using the second program function, a user can enter a calendar date, time, and/or time period into the processor 52. This enables a user to selectively program when the processor 52 is to turn "on"

or "off" one or more of the switches 34 in the switch activation unit 32. It will therefore be understood that a user can turn on/off any area circuit 24, 26, 28, 30 at any programmed time or after any programmed time interval.

The control unit 50 can be powered by the electricity of the building. However, the control unit 50 has a battery backup 53 that enables the control unit 50 to function independently.

It will be understood that using the present invention system, a user can cause the switch activation unit 32 to turn power off to a bedroom during the day or to a living room during the night. When power is turned off to any area circuit 24, 26, 28, 30, it is impossible for phantom power losses to occur in those area circuits 24, 26, 28, 30. Anything plugged into a receptacle 40 that is part of an affected area circuit 24, 26, 28, 30 is deactivated as if it were unplugged.

In the embodiment of FIG. 1 and FIG. 2, the control unit 50 communicates with the switch activation unit 32 using a wire cable 64. The control unit 50 has a signal generator 66 that creates control signals that are read and executed by the switch activation unit 32. The wire cable 64 can be any length. As such, the control unit 50 can be positioned at any convenient location within the house 12 or other building.

Figure 3:
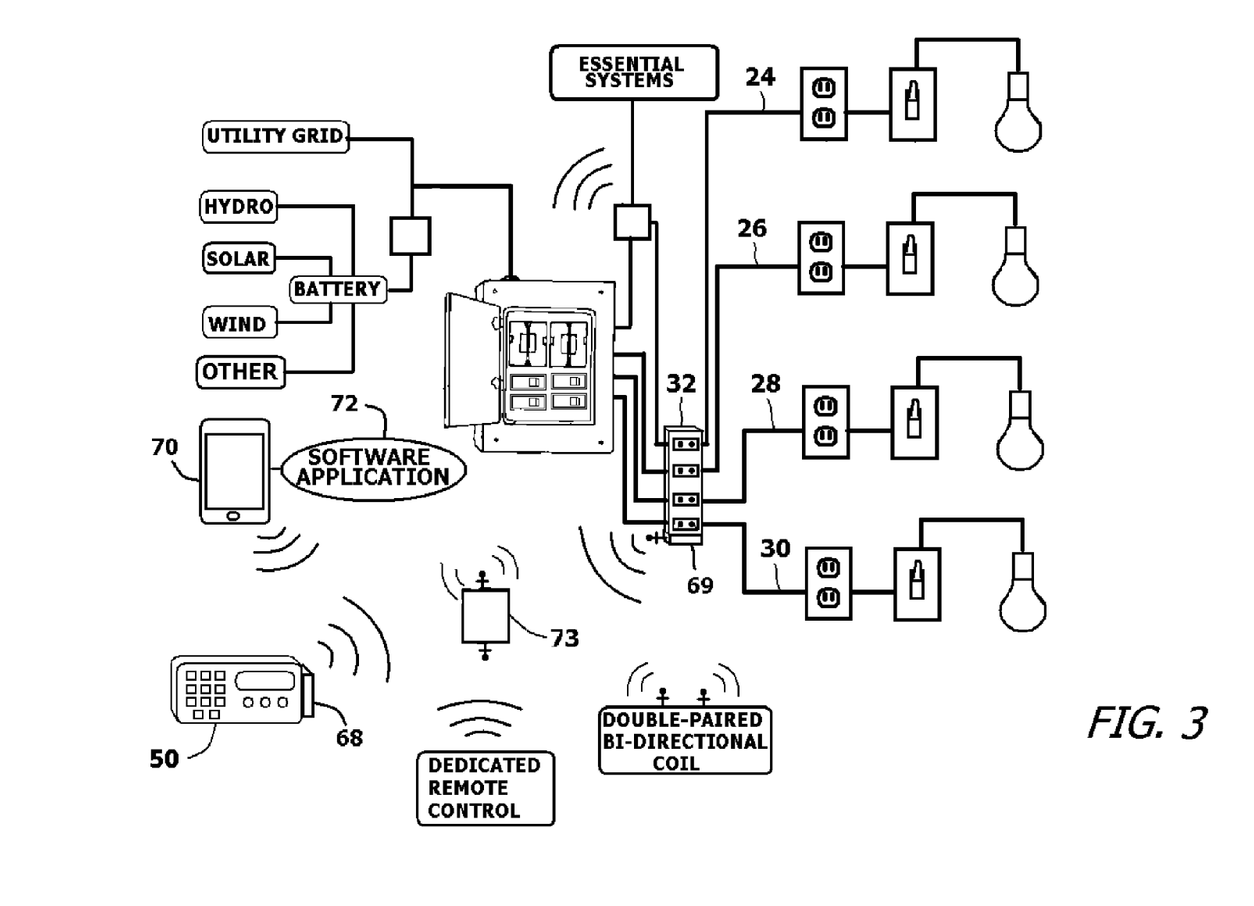
FIG. 3 is a general schematic of a modified exemplary embodiment of the overall system, wherein the control unit uses wireless communications.

Referring now to FIG. 3, it will be understood that the communication of signals from the control unit 50 to the switch activation unit 32 need not be through a wire cable. Rather, it can be done in a wireless manner. In the embodiment, the control unit 50 and the switch activation unit 32 contain transceivers 68, 69 that enable data to be exchanged in a wireless manner. The wireless communications are preferably radio transmissions. However, infrared transmissions or any other light data transmissions can be used if there is a direct line of sight between the components. Other additions, such as mirrored surfaces, can be used in a particular application to create multiple lines of sight. The wireless communications between the control unit 50 and the switch activation unit 32 can be direct. Direct communication can be achieved using radio transmissions, such as Bluetooth® transmissions. The direct data communications between the control unit 50 and the switch activation unit 32 can be supplemented by an optional amplifier relay 73 if a direct signal is weak. Alternatively, the direct data communications can be supplemented by an auxiliary power transmitting coil and power receiving coil pair. Communications can also be indirect, wherein the control unit 50 communicates with the switch activation unit 32 using a wireless network that is available in the house or building, such as a WiFi network or a LiFi network. Alternatively, other signal networks, including satellite uplink networks, can be used. In this manner, remote systems can communicate with the processor or memory of the present invention system.

It will be understood that multiple signals can be communicated between the control unit 50 and the switch activation unit 32. The multiple signals provide redundancy to the system. It also compensates for any false signals that may occur due to radio interference, wiring shorts or the like.

Since the control unit 50 has a transceiver 68 that enables it to wirelessly send and receive data, the control unit 50 can interact with a smart device 70 or other handheld electronic device that has wireless transmission capabilities, such as Bluetooth® capabilities. In this manner, the smart device 70 can run a software application 72 that enables a user to program and run the control unit 50 using the smart device 70. As such, a user can interact with the control unit 50 through the smart device 70 anywhere in the home or building. Smart devices 70 receive data through cellular networks. It will be understood that if another handheld electronic device is used, data can be received from different sources, such as data transmissions from satellites or light sources. The light sources can include directional light sources.

In the embodiments of FIG. 1 and FIG. 3, the switch activation unit 32 is a single unit that contains all of the switches 34 needed to control all of the area circuits 24, 26, 28, 30. The switch activation unit 32 is positioned near the circuit breaker box 14 to simplify wiring. However, this need not be the case. The switch activation unit 32 can be configured to contain only a single switch 34, wherein multiple switch activation units are used and one of the switch activation units is assigned to individual receptacles, switches and/or lighting fixtures.

Figure 4:
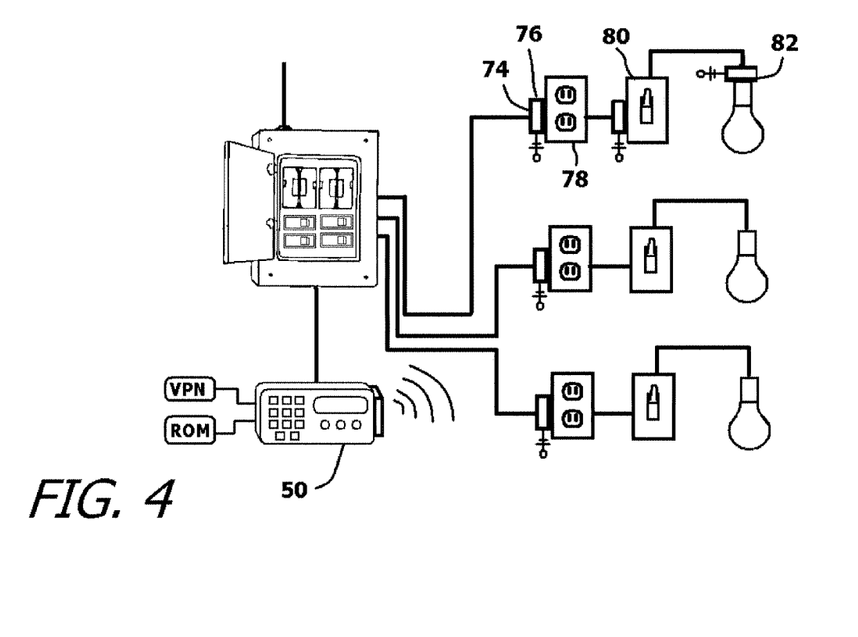
FIG. 4 is a general schematic of a modified exemplary embodiment of the overall system, wherein switches are incorporated into elements of the area circuits.

Referring to FIG. 4, such an embodiment is shown. In this embodiment, a dedicated switch activation unit 74 is used that that contains a single switch 76. The dedicated switch activation unit 74 is integrated into selected receptacles 78, selected wall switches 80, and/or selected light fixtures 82. As with the previous embodiments, the switch activation units 74 communicate with the control unit 50. The control unit 50 can therefore selectively turn "on" or "off" any specific receptacle 78, wall switch 76 and/or lighting fixture 82. Using this embodiment of the invention, a user can program specific receptacles or lights to turn "on" or "off" at different times.

Figure 5:
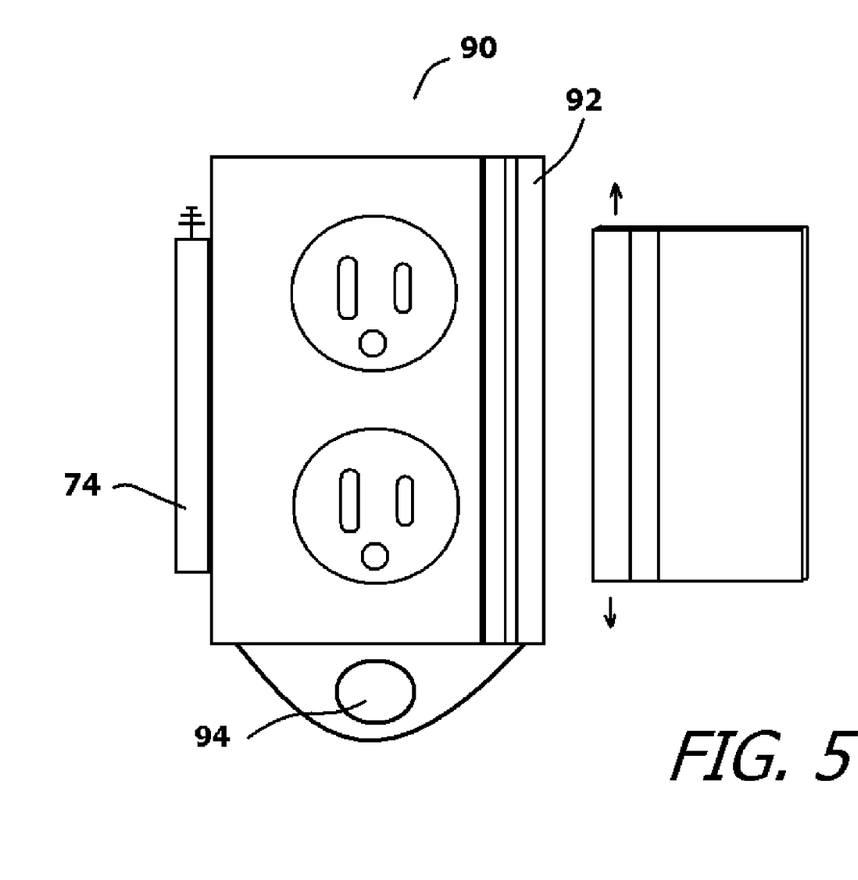
FIG. 5 shows a receptacle containing both a switch and a credit card reader.

Referring to FIG. 5 in conjunction with FIG. 4, an embodiment of a specialized receptacle 90 is shown that embodies its own switch activation unit 74. In this embodiment, a credit card reader 92 is also incorporated into the specialized receptacle 90. The receptacle 90 can be installed into a coffee shop, a hotel lobby, an airport, or any other public area where people tend to use receptacles. To utilize the specialized receptacle 90, a person must first scan his/her credit card. The data from the credit card is read and is communicated to the control unit 50. The control unit 50 uses the data to verify the credit card and charge the credit card a fee. If the credit card is verified, the control unit 50 can activate the specialized receptacle 90 for a predetermined period of time. For example, a coffee shop can have specialized receptacles 90 installed in accordance with the present invention. The specialized receptacles 90 can be made available for customers. The specialized receptacles 90 are normally "off". Using a credit card, a person can activate a specialized receptacle 90 by buying a period of time. The specialized receptacle 90 will be "on" during the period of time purchased. In this manner, the coffee shop is compensated for the cost of electricity used by customers.

Figure 6:
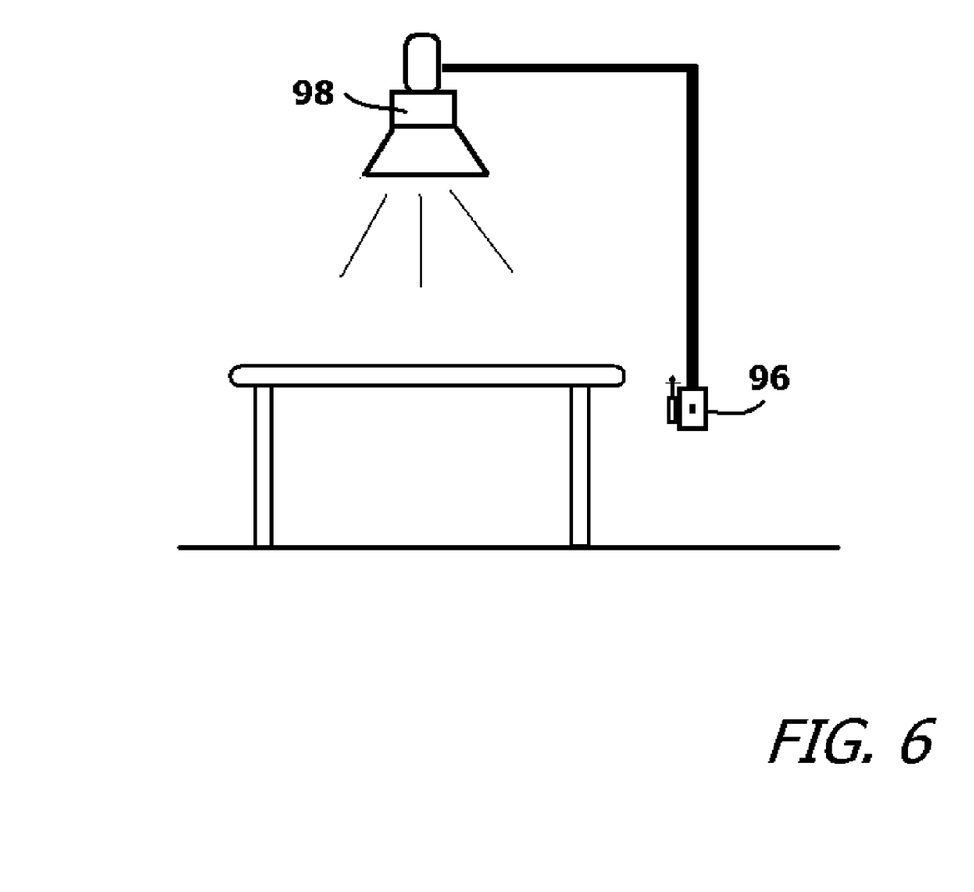
FIG. 6 shows a switch and light receptacle containing the switch of the present invention system.

The receptacle may also include an external scanner 94, such as a barcode scanner or even a biometric scanner that ensures the identity of the person using the credit card for payment. Likewise, referring to FIG. 6, it can be seen that the same system can be attached to switch 96 for a light fixture 98 or any other component of the overall system. If the scanner scans for biometrics, scanners such as fingerprint scanners, retina scanners, palm scanners, voice recognition scanners and face identification scanners can be used.

It will be understood that the embodiments of the present invention that are illustrated and described are merely exemplary and that a person skilled in the art can make many variations to those embodiments. All such embodiments are intended to be included within the scope of the present invention as defined by the claims.

What is claimed is:

1. In a building having an area circuit wired to a circuit breaker, a system for selectively controlling electricity flowing into said area circuit through said circuit breaker, said system comprising:
   an electronically controlled switch wired in series between said circuit breaker and said area circuit, said switch having an on condition, wherein said switch enables electricity to flow between said circuit breaker and said area circuit, and an off condition, wherein said switch prevents electricity from flowing between said circuit breaker and said area circuit;
   a control unit, remote from said switch, that communicates with said switch, wherein said control unit selective controls said switch between said on condition and said off condition; and
   a credit card reader coupled to said switch, wherein said credit card read communicates with said control unit and causes said control unit to activate said switch to said on condition when a fee is paid through said credit card reader.

2. The system according to claim 1, wherein said circuit breaker is disposed within a circuit breaker box and said switch is positioned adjacent said circuit breaker box.

3. The system according to claim 1, wherein said area circuit includes a receptacle and said switch is positioned adjacent said receptacle.

4. The system according to claim 1, wherein said switch includes a manual override that enables said switch to be manual altered between said on condition and said off condition.

5. The system according to claim 1, wherein said switch includes a visual indicator that enables a person to visually perceive if said switch is in said on condition or said off condition by observing said switch.

6. The system according to claim 1, wherein said control unit communicates with said switch by wire.

7. The system according to claim 1, wherein said control unit communicates with said switch using wireless signals.

8. The system according to claim 1, wherein said control unit can communicate with a remote smart phone and can be controlled through a software application run by said smart phone.

9. A system for selectively controlling electricity flowing into area circuits within a building, said system comprising:
   a circuit breaker box containing circuit breakers that divides electricity incoming to said building into said area circuits, wherein each of said area circuits is controlled by a separate one of said circuit breakers;
   a switch activation unit that contains a plurality of switches, wherein a separate switch from said plurality of switches is wired in series between each of said circuit breakers and each of said area circuits, wherein each said switch has an on condition, where said switch passes electricity, and an off condition, where said switch does not pass electricity;
   a control unit, remote from said switch activation unit, that communicates with said switch activation unit and controls said switch activation unit to cause each of said plurality of switches to independently alter between said on condition and said off condition; and
   a credit card reader that communicates with said control unit and causes said control unit to activate said switch to said on condition when a fee is paid through said credit card reader.

10. The system according to claim 9, wherein said plurality of switches in said switch activation unit all includes a manual override that enables said plurality of switches to be manual altered between said on condition and said off condition.

11. The system according to claim 9, wherein said plurality of switches in said switch activation unit all includes a visual indicator that enables a person to visually perceive if any of said plurality of switches is in said on condition or said off condition.

12. The system according to claim 9, wherein said control unit communicates with said switch activation unit by wire.

13. The system according to claim 9, wherein said control unit communicates with said switch activation unit using wireless signals.

14. The system according to claim 9, wherein said control unit can communicate with a remote smart phone and can be controlled through a software application run by said smart phone.

* * * * *